United States Patent
Roger et al.

(10) Patent No.: US 8,525,416 B2
(45) Date of Patent: Sep. 3, 2013

(54) PROCESS AND DEVICE FOR CONTROLLING A PLURALITY OF LED ASSEMBLIES OF AN AUTOMOTIVE VEHICLE

(75) Inventors: Christophe Roger, Saint-Lambert-la-Potherie (FR); Loic Flandre, Saint-Maur-des-Fosses (FR); Sebastian Krick, Paris (FR); Sylvain Yvon, Paris (FR)

(73) Assignee: Valeo Vision, Bobigny (FR)

( * ) Notice: Subject to any disclaimer, the term of this patent is extended or adjusted under 35 U.S.C. 154(b) by 310 days.

(21) Appl. No.: 13/093,104

(22) Filed: Apr. 25, 2011

(65) Prior Publication Data
US 2011/0260615 A1   Oct. 27, 2011

(30) Foreign Application Priority Data
Apr. 27, 2010   (FR) .................. 10 53215

(51) Int. Cl.
*B60Q 1/02*   (2006.01)
(52) U.S. Cl.
USPC .............. 315/82; 315/77; 315/80; 315/192; 315/291
(58) Field of Classification Search
USPC ............................... 315/77, 80, 82
See application file for complete search history.

(56) References Cited

U.S. PATENT DOCUMENTS

| | | | |
|---|---|---|---|
| 7,244,036 B2 | 7/2007 | Murakami et al. | |
| 7,902,771 B2 | 3/2011 | Shteynberg et al. | |
| 7,978,743 B2 | 7/2011 | Deppe et al. | |
| 7,986,102 B2 | 7/2011 | Roberts | |
| 2005/0179393 A1 | 8/2005 | Murakami et al. | |
| 2008/0116818 A1 | 5/2008 | Shteynberg et al. | |
| 2010/0066255 A1 | 3/2010 | Roberts | |
| 2010/0091807 A1 | 4/2010 | Deppe et al. | |
| 2010/0117562 A1 | 5/2010 | Tico et al. | |
| 2011/0156600 A1* | 6/2011 | Santo et al. | 315/185 R |
| 2011/0187276 A1 | 8/2011 | Shteynberg et al. | |
| 2012/0229027 A1* | 9/2012 | Huang | 315/80 |

FOREIGN PATENT DOCUMENTS

| | | |
|---|---|---|
| WO | 2008132562 A1 | 11/2008 |
| WO | 2009129830 A1 | 10/2009 |
| WO | 2010030462 A1 | 3/2010 |

* cited by examiner

*Primary Examiner* — Anh Tran
(74) *Attorney, Agent, or Firm* — Jacox, Meckstroth & Jenkins

(57) ABSTRACT

A process and a device for controlling a plurality of LED assemblies of an automotive vehicle, each LED assembly (Gi) executing a specific lighting/signalling function. The electrical power level (Pi) delivered by the electrical source is modulated according to distinct power levels (Pi) with relation to the function associated with each LED assembly (Gi) and temporary multiplexing is executed in order to successively transmit the distinct power levels (Pi) to the assemblies (Gi) over a multiplexing period (Tmux). Demultiplexing is effected and each distinct electrical power level (Pi) is selectively delivered to the LED assembly (Gi) concerned.

20 Claims, 4 Drawing Sheets

FIG. 1A (Piror Art)

PROCESS AND DEVICE FOR CONTROLLING A PLURALITY OF LED ASSEMBLIES OF AN AUTOMOTIVE VEHICLE

CROSS-REFERENCE TO RELATED APPLICATIONS

This application claims priority to French Application No. 1053215 filed Apr. 27, 2010, which application is incorporated herein by reference and made a part hereof.

BACKGROUND OF THE INVENTION

1. Field of the Invention

The invention relates to a process and a device for controlling a plurality of light emitting diode assemblies, or LEDs, equipping an automotive vehicle. In the present application, an LED assembly could be an assembly of one LED or of a number of LEDs.

2. Description of the Related Art

Current automotive vehicles are equipped with LED assembly, each of these assemblies being allocated a specific lighting and/or signalling function. The aforesaid specific functions, if not the LED assemblies themselves, are subject to strict regulations governing their parameters, including minimum and/or maximum illumination intensity, the electrical power necessary for performing each of these functions, the spread of the intensity of illumination when the function involves street lighting, taking account of traffic conditions.

Among the numerous functions currently embodied on automotive vehicles, it is possible to mention, in particular, by way of non-exhaustive example, Turn Indicators (TIs), Day Running Lights (DRLs), Parking Lights (PLs) and Cornering Lights (CLs). Other functions such as brake lights, reversing lights, main beams and dipped beams form part of all of the functions embodied by LED assemblies, whether at the front, at the rear or on the sides of current automotive vehicles.

Multiplication of these functions and of the LED assemblies corresponding to them poses however not only the problem of rationalization of their integration on automotive vehicles, but equally that of their electrical power supply, in accordance with current standards and regulations, and, above all, of their simultaneous or discrete control, with a minimum of components and circuits.

At the current time, as illustrated schematically in FIG. 1A relating to the prior art known to inventors, a power/control module assembly labeled MP1/C1, Mpi/Ci to MPn/Cn is allocated to an LED assembly G1, Gi to Gn. The power module specific to the LED assembly and to the function concerned is the one most often integrated into the control module and suitable for delivering an average electrical power Pmi corresponding to the function of the LED assembly Gi concerned.

This simplistic type of architecture involves multiplication of the electrical components and an increase in the space necessary for embodiment for all of the functions. Furthermore, in the event of multiplication of the functions, multiplication of the power/control modules makes the synchronization of these functions and of the LED assemblies corresponding to them more difficult.

More recently, as represented in FIG. 1B relating to the prior art known to inventors, in order to facilitate the synchronization of a number of functions, it has been proposed to group the control step associated with a number of corresponding LED assemblies. However, although permitting a reduction in overall dimension, this new architecture has the inconvenience of requiring a specific power module per function and per LED assembly for the reasons indicated earlier, without however facilitating synchronization of the functions.

In the two cases of prior art, as illustrated with reference to FIGS. 1A and 1B, allowing for additional functions requires the necessary addition of at least one power module delivering sufficient average power.

SUMMARY OF THE INVENTION

The present invention aims to remedy the inconveniences of the solutions of the prior art referred to above.

Consequently, an object of the present invention is the embodiment of a process and of a device for controlling a plurality of LED assemblies, the architecture of which is simplified and rendered noticeably independent of the number of functions and LED assemblies involved.

In particular, one object of the present invention is the embodiment of a control process for a plurality of LED assemblies of highly flexible embodiment independently of the number of functions and/or LED assemblies activated, making it possible to adapt the process forming the object of the invention to the number of LED assemblies controlled.

Another object of the present invention is the embodiment of a device for controlling a plurality of LED assemblies with a single power module, which permits the embodiment of an architecture which can be readily adapted and developed as a function of the number of LED assemblies controlled.

The process for controlling a plurality of LED assemblies of an automotive vehicle, forming the objects of the invention, from an electrical power source applies to LED assemblies to which there is associated to each of these LED assemblies at least one specific lighting and/or signalling function of the vehicle.

The process is noteworthy in that, for a given rated electrical power of the source, this process comprises the steps of modulating the electrical power level delivered by the source according to distinct power levels with relation to the function associated with each LED assembly, temporally multiplexing and successively transmitting to the LED assemblies the distinct electrical power levels over a given multiplexing period, de-multiplexing and selectively delivering each distinct electrical power level to at least one LED assembly.

Advantageously, the modulation of the electrical power level comprises pulse modulation of the electrical power delivered to each LED assembly.

Advantageously, the modulation of the electrical power level comprises a modulation of the cyclic ratio of the pulses over at least one multiplexing period.

Advantageously, the pulse modulation of the electrical power level comprises, for each distinct power level, the following steps:

establishing the average level of electrical power associated with each function;

adapting the distinct electrical power level and/or the cyclic ratio over the duration of the multiplexing period.

The process according to the invention is also noteworthy in that it comprises a step of controlling the modulation of the cyclic ratio of the distinct power level pulses over at least one multiplexing period on activation by an internal event such as vehicle manual control, in particular detection of an external event such as detection of a day/night or unexpected clear/obscure environment, variation in the degree of hygrometry, variation in the temperature of an assembly of one LED or of an LED assembly.

According to the process, the multiplexing period of the distinct electrical power levels is adjustable to a maximum value corresponding to a multiplexing frequency greater than 80 Hertz. This makes it possible to improve the perception of continuous light flow by the human eye.

The multiplexing period of the distinct electrical power levels is adjustable to a minimum value corresponding to a multiplexing frequency less than 400 Hertz. This makes it possible to have less overheating of the LEDs. It also makes it possible to have less constraint on the response times of the LED driving means. It is thus possible to use cheaper components. Equally, having less overheating simplifies the design of the optical modules containing one or more of these LEDs.

The invention also covers a control device for controlling a plurality of LED assemblies of an automotive vehicle from an electrical power source, each LED assembly having associated with it at least one lighting or signalling function. For a given rated electrical power of the source, this device comprises at least:

means of modulating the electrical power level delivered by the source according to distinct power levels with relation to the function associated with each LED assembly;

means of multiplexing the distinct electrical power levels and transmitting them to the LED assemblies over a given multiplexing period;

means of demultiplexing and distributing at least one distinct electrical power level to at least one LED assembly.

The control device for controlling a plurality of LED assemblies of an automotive vehicle from an electrical power source, each LED assembly having associated with it a lighting or signalling function, according to the invention, is noteworthy in that, for a given rated electrical power of the source, this device comprises at least:

means of modulating the electrical power level delivered by the source according to distinct power levels with relation to the function associated with each LED assembly;

means of multiplexing the distinct electrical power levels and transmitting them to the LED assemblies over a given multiplexing period;

means of demultiplexing and distributing at least one distinct electrical power level to at least one LED assembly.

The control device according to the invention is equally noteworthy in that the means of modulating the electrical power level delivered by the source comprise at least:

a single electrical power source delivering electrical power with a current adjustable according to a given number of distinct current levels, each distinct current level corresponding to at least one distinct electrical power level;

a power control module linked to the single electrical power source and enabling the successive selection of a distinct current level delivered by the electrical power source.

The device according to the invention is equally noteworthy in that the multiplexing and demultiplexing means comprise at least:

a module for switching the LED assemblies receiving the distinct current levels delivered by the single electrical power source, each LED assembly being linked to the switching module to receive or not to receive, selectively over time, the distinct current level, and the distinct electrical power level, associated with the function devolved to each of these LED assemblies;

a switching control module linked on the one hand to the power control module and on the other hand to the switching module to provide by synchronized control of the power modulation and of the successive distinct levels of current delivered by the single power source and of the switching of the LED assemblies, the temporary multiplexing-demultiplexing operation selectively delivering each electrical power level to at least one LED assembly.

The device according to the invention is equally noteworthy in that each LED assembly is also connected in series to an adjustable current generator controlled by the switching control module and making it possible to modulate the intensity of the electrical current and the distinct electrical power supplying each LED assembly concerned.

The device according to the invention is also noteworthy in that the power control module and the switching control module are made up of a programmed microcontroller.

The device according to the invention is also noteworthy in that the programmed microcontroller is linked to at least one internal control, the automotive vehicle's column switch.

The device according to the invention is also noteworthy in that the programmed microcontroller is linked to at least one external event sensor such as a day/night or unexpected clear/obscure environment, degree of hygrometry, temperature sensor.

The invention also covers a computer program product recorded on a storage medium and comprising a sequence of instructions executable by a computer or a calculator, by a specially dedicated integrated circuit or a dedicated microcontroller, for embodiment of the process according to the invention or to be embodied by the device according to the invention. It is noteworthy in that it comprises at least, for a given rated electrical power of the power source and for a given multiplexing period:

a step of calculation of the cyclic ratio of the power pulses allocated to each LED assembly, the cyclic ratio being defined by default by the ratio of the multiplexing period to the number of active LED assemblies;

a step of detection of the existence of an internal control; and, in the absence of any internal control;

a step of calculation of each distinct power level devolved to each LED assembly defined as the ratio of the average level of electrical power associated with the function devolved to each LED assembly to the value of the cyclic ratio of the electrical power pulse over the multiplexing period; otherwise, in the presence of an internal control;

a step of returning to the calculation of the cyclic ratio of the power pulses allocated to each LED assembly after re-updating of the number of active LED assemblies, taking account of the activation or deactivation of at least one LED assembly due to the existence of the internal control.

The invention also covers a computer program product recorded on a storage medium and comprising a sequence of instructions executable by a computer or a calculator, by a specially dedicated integrated circuit or by a dedicated microcontroller, for the embodiment of the process according to the invention or to be embodied by the device according to the invention. It is noteworthy in that it comprises at least, for a given rated electrical power of the power source and for a given multiplexing period:

a step of calculation of each distinct power level devolved to each LED assembly defined as the ratio of the average level of electrical power associated with the function devolved to each LED assembly to the value of the cyclic ratio of the electrical power pulse over the multiplexing period; and a step of detection of an external event; and, in the absence of any external event;

a step of returning to the step of calculation of each distinct power level devolved to each LED assembly; otherwise, in the presence of an external event modifying the conditions of illumination of the lighting and/or signalling;

a step of returning to the initial step, for modification of the multiplexing period and/or cyclic ratio.

The process and the device forming the objects of the invention find an application in the construction of automotive vehicles of any type, private cars, heavy goods vehicles, building machines, port vehicles, two-wheeled vehicles for example.

They will be better understood on reading the description below and looking at the drawings.

BRIEF DESCRIPTION OF THE ACCOMPANYING DRAWINGS

FIGS. 1A and 1B are schematic illustrations of prior art control mobile assemblies;

Figure 5:
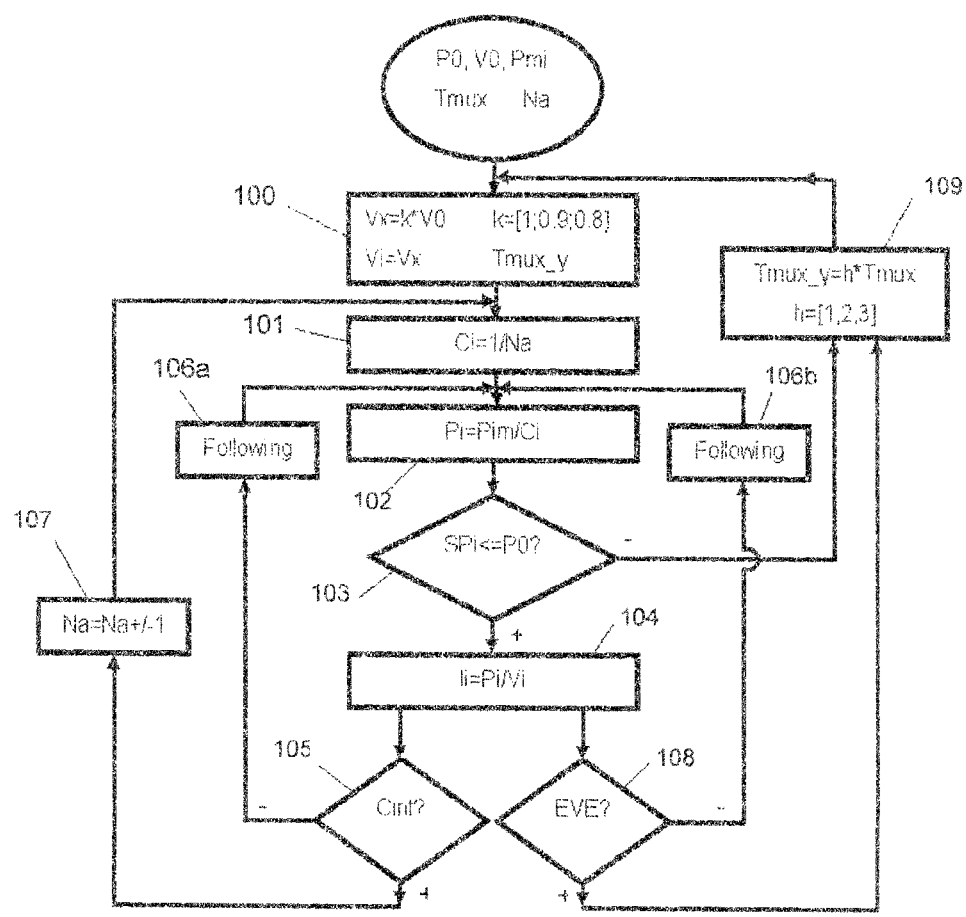
Figure 4A:
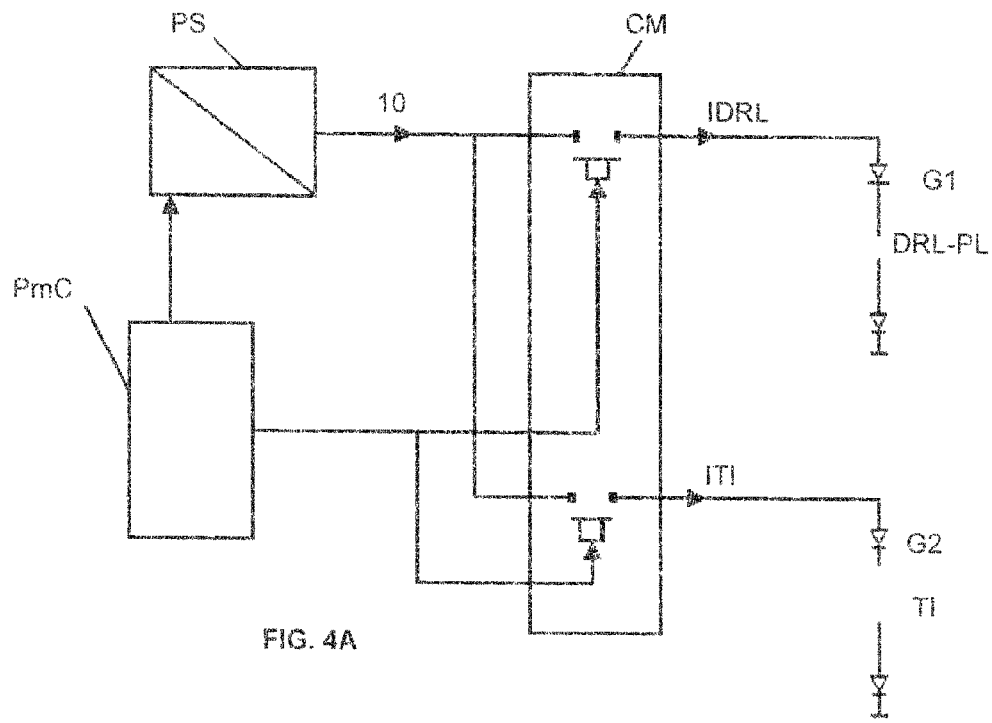
FIG. 4A shows a particular non-limiting form of embodiment of the device forming the object of the invention applied to two specific functions such as the functions DRL-PL and TI.
Figure 4B:
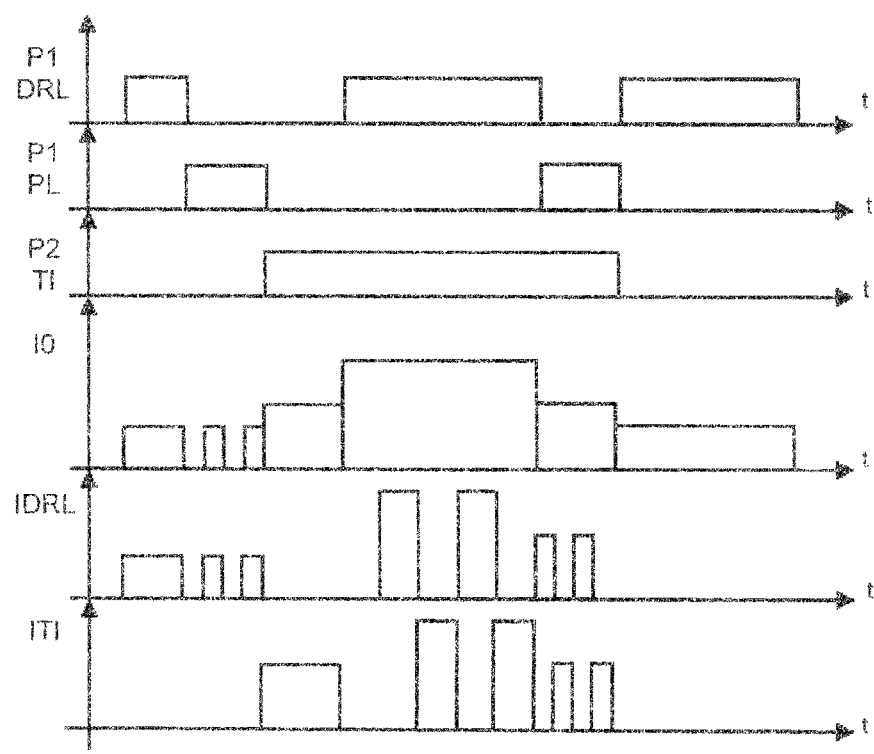

FIG. 4B shows a chart of the control signals applied to the LED assemblies embodying the above-mentioned functions DRL-PL and TI; and FIG. 5 shows purely by way of illustration a chart of the essential steps of a computer program product permitting the embodiment of the process and of the device forming the objects of the invention, taking account of the existence or non-existence of an internal control executed at the initiative of the driver of the vehicle such as the existence or otherwise of an external event modifying the intensity of the illumination necessary for execution of the lighting and/or signalling functions.

DETAILED DESCRIPTION OF THE PREFERRED EMBODIMENTS

A more detailed description of the process forming the object of the invention will now be given with respect to FIG. 2.

With reference to the above-mentioned figure, the process forming the object of the invention is embodied from an electrical power source with a rated power output P0.

Figure 1B:
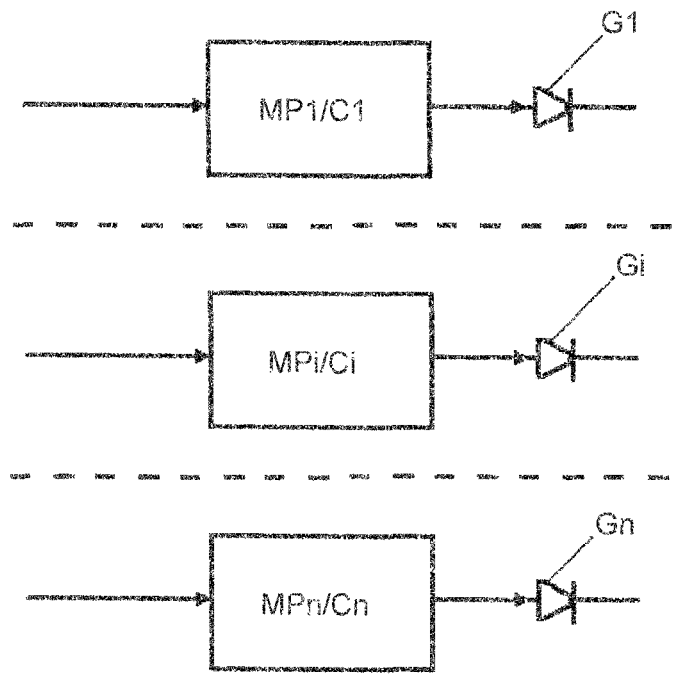
Figure 1B:
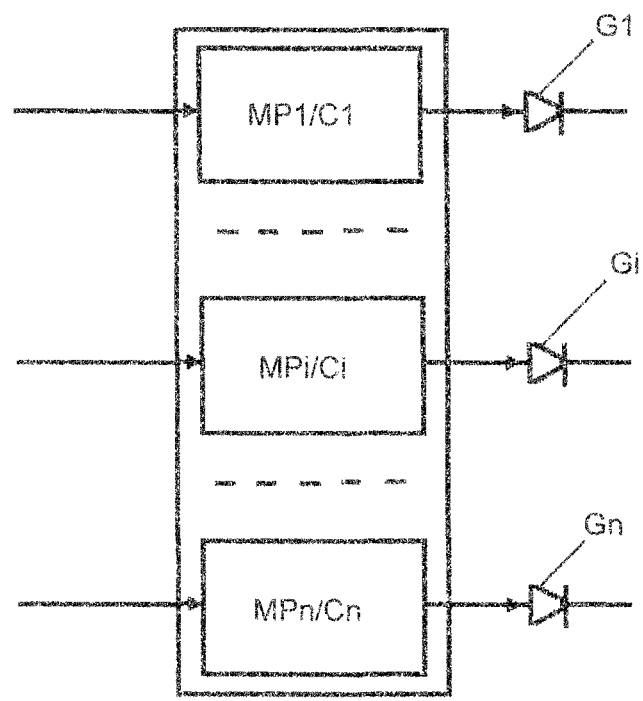
Figure 2:
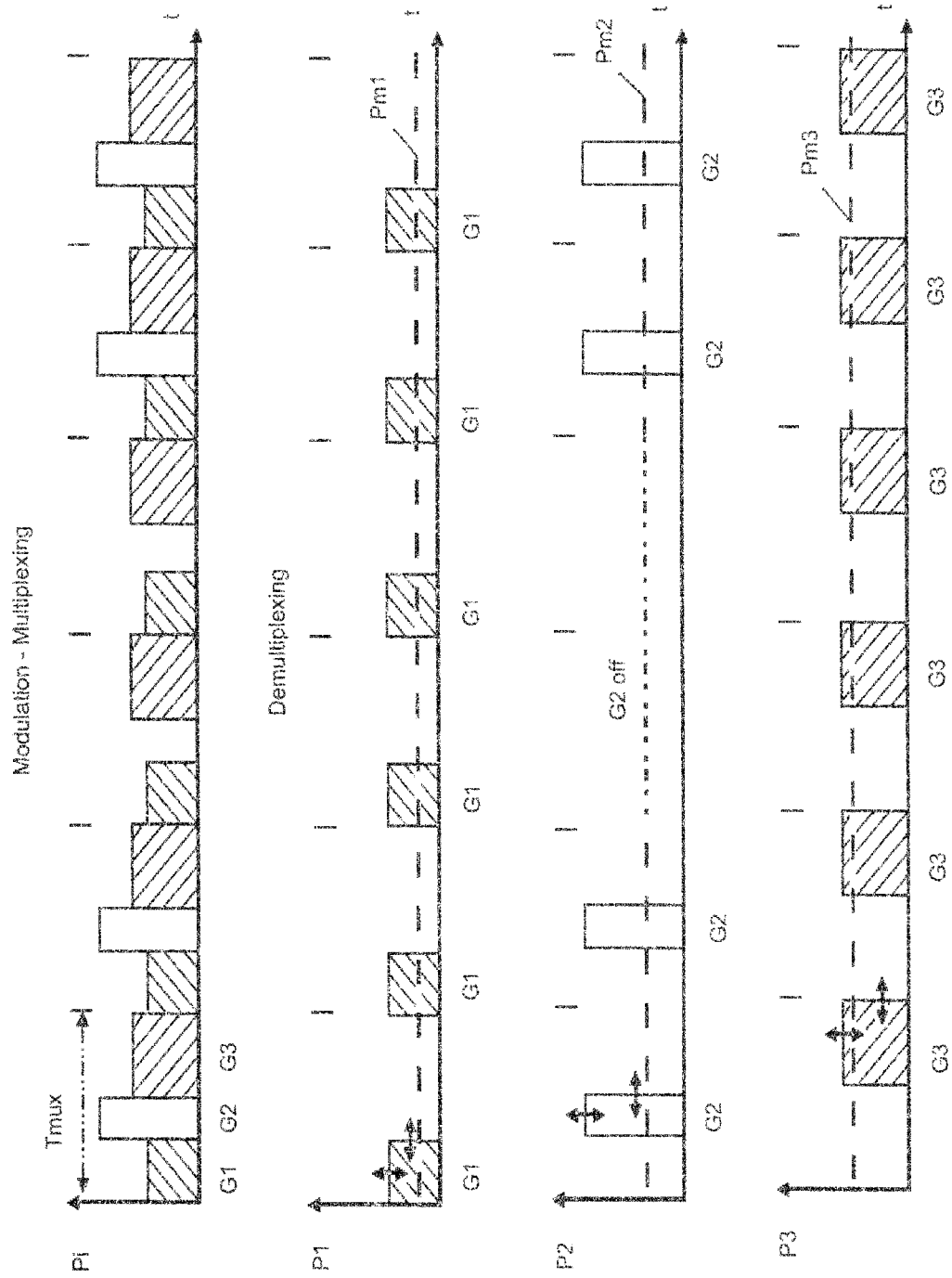
FIG. 2 shows a chart of the operations of electrical power level modulation and of temporary multiplexing of these electrical power levels to the LED assemblies concerned.

It comprises, with reference to FIG. 2, a step of modulation of the electrical power level delivered by the source according to distinct power levels, each labeled Pi, each of these power levels being defined with relation to the function associated with each corresponding assembly or LED assembly, labeled Gi.

In FIG. 2, it can be seen that there is associated with each LED assembly Gi an average power level Pmi corresponding to the signalling and/or lighting function of the LED assembly Gi concerned.

Consequently the chart, called Modulation-Multiplexage [Modulation-Multiplexing] in FIG. 2, shows the distinct successive power levels Pi in a number of distinct power levels limited to three, so as not to overload the drawing, and the charts called Démultiplexage [Demultiplexing] show the temporary demultiplexing of the distinct electrical power levels Pi successively transmitted to the corresponding LED assembly Gi. It will be recalled that the notion of temporary multiplexing-demultiplexing of signals designates the technique consisting of transmitting and receiving a number of distinct information signals on the same transmission medium by means of a number of successive elementary channels defined by interlacing of these signals over time on these elementary channels.

Thus it can be appreciated that the distinct power levels Pi are delivered selectively to the corresponding LED assembly of rank i. Modulation of the electrical power level at the level of each LED assembly comprises a pulse modulation of the electrical power delivered by the power source to the LED assembly.

The supply current Ii of each LED assembly is not continuous. It can be understood, in particular, that modulation of the electrical power level of each distinct power level Pi can comprise or be, advantageously, an adjustment, or otherwise a pulse modulation, of the voltage output V0 delivered by the power source and/or of the intensity of the electrical current Ii consumed by each LED assembly Gi concerned. Preferably, the voltage level delivered by the power source is adjusted, and this level can be adjusted to a near value, less or greater than the voltage output V0 delivered by the source and the intensity of the electrical current Ii consumed by each LED assembly is modulated.

As shown in FIG. 2, and for a multiplexing period Tmux with a pre-established given value, according to a noteworthy aspect of the process forming the object of the invention, modulation of the electrical power level can comprise a modulation of the cyclic ratio Ci of the distinct power pulses Pi over the multiplexing period concerned. The above-mentioned FIG. 2 shows that the process of modulation of the distinct power levels Pi is symbolized by double vertical arrows applied to each of the distinct power levels and that the process of modulation of the cyclic ratios Ci is represented by double horizontal arrows, these double arrows making it possible to modify by modulation the distinct values of power Pi and/or of cyclic ratios Ci.

As also shown in FIG. 2, an interruption of a signalling and or lighting function is applied to the LED assembly G2 by an interruption over a number of multiplexing periods of the current supply of the LED assembly G2 concerned. Thus, the pulse modulation of the distinct power level Pi, and of course of the electrical power level delivered by the source, can comprise, for each distinct power level, steps of establishing the average electrical power level Pmi associated with each function and for adapting the distinct electrical power level Pi, by adjustment either of the voltage Vi, or of the intensity Ii or even of the cyclic ratio Ci of the power pulses Pi delivered to the LED assembly Gi concerned, for the duration of the multiplexing period Tmux.

It will be thus be understood, that the process forming the object of the invention then comprises the step of controlling the modulation of the cyclic ratio of the pulses of distinct power level for at least one multiplexing period on disengagement by an event internal to the vehicle, such as manual control of the column switch by the vehicle driver, on suppression of a function, for example after execution of a control for turning of the vehicle and the corresponding blinker function TI, as represented for the LED assembly G2 illustrated in FIG. 2 or on the detection of an external event such as detection of a day/night or unexpected clear/obscure environment, during the passage of the vehicle through a tunnel, or even a sudden variation in the degree of hygrometry and/or in the temperature of an LED or an LED assembly requiring adaptation of the illumination levels or intensities of the signalling and/or lighting functions.

Lastly, the period of multiplexing Tmux of the distinct levels Pi of electrical power can be adjusted to a value corresponding to a multiplexing frequency greater than 80 Hertz. The multiplexing period Tmux can also be adjusted to a value corresponding to a multiplexing frequency less than 400 Hertz. The multiplexing period values included in the above-mentioned range make it possible to ensure both a switching frequency of signalling and/or lighting signals compatible with human after-image and a reduction in the overheating constraints of LEDs or LED assemblies.

This way of operating gives the process forming the object of the invention great flexibility of embodiment and a wide degree of adaptability to all types of vehicles and their different conditions of use, as will be described later in the description.

The device for controlling a plurality of LED assemblies for automotive vehicles, conforming to the object of the present invention, will now be described with respect to FIG. 3.

As can be seen in the above-mentioned figure, this device comprises an electrical power source, PS, delivering for example a given rated electrical power output with a value P0.

The device forming the object of the invention also comprises modulation resources, labeled Modulation in FIG. 2, for modulating the electrical power level delivered by the source according to the distinct power levels Pi. The above-mentioned distinct power levels are in direct relation with the function associated with each LED assembly Gi.

In addition, the device comprises resources for the multiplexing and transmission to the LED assemblies Gi of the distinct electrical power levels Pi over a multiplexing period, labeled Tmux. In FIG. 3, the multiplexing resources are labeled Multiplexage [Multiplexing].

Lastly, the device forming the object of the invention comprises resources for the demultiplexing and distribution of at least one distinct electrical power level Pi of at least one LED assembly Gi. The demultiplexing and distribution resources are Démultiplexage [Demultiplexing].

Figure 3:
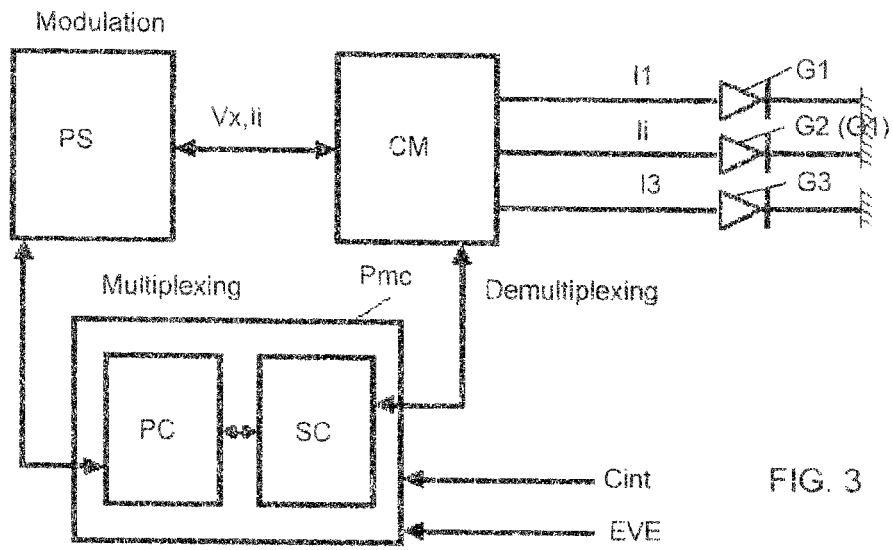
FIG. 3 shows, by way of illustration, a functional diagram of the device forming the object of the invention.

The control device forming the object of the invention is particularly noteworthy in that the modulation resources Modulation comprise a single electrical power source, labeled PS in FIG. 3, delivering electrical power with an adjustable voltage Vx according to a given number of distinct voltage levels. Each distinct voltage level Vx delivered by the single electrical power source PS corresponds to at least one distinct voltage level Vi and to at least one distinct power level Pi. The electrical power source PS is linked to and controlled by a power control module PC permitting the successive selection of a distinct power level Pi from a corresponding adjusted distinct voltage level Vi delivered by the electrical power source PS. Preferably, a voltage level Vx being chosen, it is advantageously possible to effect modulation of the current Ii and thus of the power Pi consumed by the LED assembly Gi concerned, as mentioned earlier.

By way of non-exhaustive example, it is shown that the single electrical power source PS can advantageously be made up of a direct current voltage convertor, supplied from the battery of the vehicle. This traditional type of convertor, known to the state of the art, will not be described in detail.

With reference to the same FIG. 3, it is shown that the multiplexing-demultiplexing resources comprise, for example, a switching module CM for switching the assemblies or LED assemblies Gi. The aforesaid module receives the distinct voltage and/or current levels Vi, Ii and thus the distinct power levels Pi delivered by the single electrical power source PS by means of a power cable. Each LED assembly Gi is linked to the switching module CM to receive or otherwise, selectively over time, as represented in FIG. 2, the distinct electrical power level Pi and the distinct voltage and/or current level Vi, Ii associated with the function devolved to the LED assembly Gi concerned.

A switching control module, labeled SC, is provided and linked, on the one hand, to the power control module PC and, on the other hand, to the switching module CM to ensure by synchronized control of the power modulation, both of the successive distinct levels of distinct voltage and/or current Vi, Ii and of distinct electrical power Pi delivered by the single power source, and of the switching of the LED assemblies Gi, the temporary multiplexing-demultiplexing operation selectively delivering each electrical power level to at least one LED assembly.

As can also be seen in FIG. 3, each LED assembly Gi is also connected in series directly to the power module, by means of a switching module CM, controlled by the switching control module SC. The latter makes it possible to modulate the intensity of the electrical current Ii and the distinct electrical power Pi thus supplying each LED assembly Gi concerned.

More specifically, it is shown that the switching module CM is advantageously made up of a battery of electronic switches each controlled by the switching control module SC.

Lastly, FIG. 3 shows the power control module PC and the switching control module SC as two distinct module interconnected to ensure the synchronism of the overall control. In a non-limiting preferred form of embodiment, the two above-mentioned modules can advantageously be made up of a single element formed by a programmed microcontroller, labeled Pmc.

An exemplary embodiment of the control device forming the object of the invention, limited to the control of two LED assemblies G1 and G2, to which the functions of DRL-PL respectively of TI are allocated, will now be described with respect to FIGS. 4A and 4B.

FIG. 4A shows the essential elements of FIG. 3, the switching module CM being represented in the form of the battery of switches, 2 in number, and making it possible to drive the corresponding LED assemblies. The intensity generators are not represented in FIG. 2, in order not to overload the drawing.

FIG. 4B shows the charts of intensity and thus of distinct electrical power delivered to each of the LED assemblies G1 and G2 to which are associated the functions DRL-PL respectively TI.

A process for effecting operations of multiplexing and modulation of the distinct power levels will now be described with respect to FIG. 5.

The aforesaid process is embodied by means of a computer program and of course by the programmed microcontroller Pmc represented in FIG. 3.

The above-mentioned computer program consequently permits the embodiment of the process and of the device for controlling LED assemblies of an automotive vehicle as described earlier in the description.

By way of non-exhaustive example, the above-mentioned computer program is recorded on a storage medium and comprises a sequence of instructions executable by a computer, such as the vehicle's on-board computer, or, preferably, by a calculator, by a specially dedicated integrated circuit, called ASIC ("Application Specific Integrated Circuit"), or by a dedicated microcontroller, such as the programmed microcontroller mentioned earlier.

With reference to FIG. 5, the variables of the start state of the overall system are for example the rated power output P0 of the single power source, the voltage output V0 delivered by it, the average electrical power Pmi associated with each of the lighting and/or signalling functions embodied, and the multiplexing period Tmux. Also, advantageously, the above-mentioned variables may comprise the number Na of LED assemblies Gi in operation. This number can, for example, be determined by the vehicle's on-board computer when it starts up.

As regards the multiplexing period, Tmux, it can advantageously be chosen with a given value corresponding to a multiplexing frequency of between 80 and 400 Hertz. These values make it possible, in particular, to ensure signalling and/or lighting perceived continuously by a human observer and permit a simple and cheaper design of the optical modules comprising the LED assemblies of the device according to the invention.

As represented in FIG. 5, the driving process can comprise a step 100 of initialization in which the value of the electrical voltage Vx delivered by the single electrical power source PS is established at a value Vx=k*V0, where the coefficient k may be any of the values 1, 0.9 or 0.8 for example. The value of the distinct voltage Vi can then for example be established with the value Vi=Vx. The value of the current multiplexing period labeled Tmux_y can then be established by default at the value Tmux used.

The step 100 can be followed by a step 101 of calculation of a cyclic ratio Ci=1/Na. This value, arbitrary by default, makes it distinctly possible to spread the electrical power transmitted by the switching module CM successively to the active LED assemblies Gi throughout the duration of the multiplexing period.

The step 101 is followed by a step 102 of calculation of the current distinct electrical power Pi, defined as the ratio of the average electrical power Pmi associated with the function of the current LED assembly Gi at the value of the cyclic ratio Ci calculated at the preceding step 101 according to the relationship Pi=Pmi/Ci. A verification testing step 103 makes it possible to check that the sum of the distinct electrical powers allocated, labeled SPi, SPi=Pi+ . . . +Pi, is less than or equal to the rated electrical power output P0 of the single power source PS.

With a positive response to the test 103, a step 104 is effected making it possible to calculate the intensity of the electrical current Ii consumed by the current LED assembly Gi, intensity defined as the ratio of the distinct electrical power Pi calculated at the step 102 to the current electrical voltage Vi by the relationship Ii=Pi/Vi.

The step 104 can then be followed by a step 105 to test for the existence of an internal control Cint executed by the vehicle driver for example. At the step 105, the existence test is labelled Cint?.

With a negative response to the test 105, a step of returning to the step 102 is executed after passing at the step 106a to the following LED assembly, the step 106 being labelled i_suivant [following].

It will be understood that the aforesaid looping at the step 102 permits the iterative continuation of the calculation of the intensity Ii of the current of each successive active LED assembly Gi and to supply them by the multiplexing of electrical power as indicated.

On the other hand, with a positive response to the test 105, either in the presence of the engagement or disengagement of a signalling and/or lighting control by the driver of the vehicle for example, a return to the step 101 is executed by means of a step 107 of updating the number of active LED assemblies. This operation is labeled Na=Na+/−1 at the step 107.

With a negative response to the test step 103, in the event that the sum of the powers distributed SPi is greater than the rated power output P0 of the single electrical power source, a return to the initialization step 100 is executed for re-initialization of the assembly. The aforesaid return could be effected advantageously after re-updating at the step 109 of the multiplexing period to a value distinct from the preceding one according to the relationship:

Tmux_y=h*Tmux, where h=[1,2 or 3] for example.

It will be understood, in particular, that in the event that the sum of the powers distributed appears greater than the rated power output of the single source, initialization of the assembly must be re-executed, and a different multiplexing period value can be chosen. Re-execution of the step of initialization 100 also makes it possible to recalculate the cyclic ratio Ci at the following step 101.

Moreover, as represented in FIG. 5, following the step 104 for example, a test step 108 could be executed, in order to determine the existence of an event external to the vehicle, test labeled EVE?.

With a negative response to the test 108, in the absence of any external event, a return to the step 102 is executed for continuation of the iterative process of calculation of distinct electrical power Pi. This return is effected after re-updating labeled i_suivant at the step 106b, analogous to the step 106a.

On the other hand, with a positive response to the test 108, a return to the initialization step 100 can advantageously be effected by means of the step 109 described earlier.

The preceding process as described makes it possible advantageously to modulate and modify all of the parameters of the process and in particular the supply voltage, the intensity of the supply current of the LED assemblies Gi, and in particular, the cyclic ratio of the modulation pulses of the distinct electrical power delivered to them by multiplexing. It also makes it possible particularly advantageously to modulate or adjust the multiplexing period with a multiplexing frequency value in the range between 80 and 400 Hertz as referred to earlier.

Thus, the process and the device forming the objects of the invention permit, in particular, very wide flexibility of use, irrespective of the number of lighting and/or signalling functions embodied and active on the automotive vehicle concerned. This makes it possible, in particular, to optimize the supply of the LED assemblies with electrical energy and the consumption of electrical energy thus realized. Furthermore, the possibility of modulating or adjusting the multiplexing period and/or cyclic ratio of the electrical energy pulses distributed makes it possible to optimize the operation of the assembly vis-á-vis the conditions external to the vehicle, such as detection of a day/night or unexpected clear/obscure environment, variations in the degree of hygrometry and conditions of correlative visibility, heat regulation and/or thermal protection of the LED.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A control process for a plurality of LED assemblies of an automotive vehicle from an electrical power source, there being associated with each LED assembly a specific lighting and/or signalling function, wherein for a given rated electrical power of the source, this process comprises at least the following steps:

modulating the electrical power level delivered by the source according to distinct power levels with relation to the function associated with each LED assembly;

temporally multiplexing and successively transmitting the distinct electrical power levels to the LED assemblies over a given multiplexing period;

demultiplexing and selectively delivering each distinct electrical power level to at least one LED assembly.

2. The control process according to claim 1, wherein the modulation of the electrical power level comprises a pulse modulation of the electrical power delivered to the LED assembly.

3. The control process according to claim 2, wherein the modulation of the electrical power level comprises a modulation of the cyclic ratio of the pulses over at least one multiplexing period.

4. The control process according to claim 2, wherein the pulse modulation of the electrical power level comprises for each distinct power level, the following steps:

establishing the average level of electrical power associated with each function;

adapting the distinct electrical power level and/or the cyclic ratio over the duration of the multiplexing period.

5. The control process according to claim 2, wherein said control process comprises a step of controlling the modulation of the cyclic ratio of the distinct power level pulses over at least one multiplexing period on activation by an event internal to the vehicle such as vehicle manual control, or by the detection of an external event such as the detection of a day/night or unexpected clear/obscure environment, variation in the degree of hygrometry, variation in the temperature of an LED or of an LED assembly.

6. The control process according to claim 1, wherein the multiplexing period of the distinct electrical power levels is adjustable to a maximum value corresponding to a multiplexing frequency greater than 80 Hertz.

7. The control process according to claim 1, wherein the multiplexing period of the distinct electrical power levels is adjustable to a minimum value corresponding to a multiplexing frequency less than 400 Hertz.

8. A control device for controlling a plurality of LED assemblies of an automotive vehicle from an electrical power source, there being associated with each LED assembly at least one lighting or signalling function, wherein, for a given rated electrical power of the source, this device comprises at least:

means of modulating the electrical power level delivered by the source according to distinct power levels with relation to the function associated with each LED assembly;

means of multiplexing and transmitting the distinct electrical power levels to the LED assemblies over a given multiplexing period;

means of demultiplexing and distributing at least one distinct electrical power level to at least one LED assembly.

9. The control device according to claim 8, wherein the means of modulating the electrical power level delivered by the source comprise at least:

a single electrical power source delivering electrical power with an adjustable voltage according to a given number of distinct current levels, each distinct current level corresponding to at least one distinct electrical power level;

a power control module linked to the single electrical power source and enabling the successive selection of a distinct current level delivered by the electrical power source.

10. The control device according to claim 8, wherein the means of multiplexing and demultiplexing comprise at least:

a switching module for switching the LED assemblies receiving the distinct current levels delivered by the single electrical power source, each LED assembly being linked to the switching module so as to receive or not to receive, selectively over time, the distinct current level, and the distinct electrical power level, associated with the function devolved to each of these LED assemblies;

a switching control module linked on one hand to the power control module and on the other hand to the switching module to ensure, by synchronized control, the modulation of power and of the successive distinct levels of current delivered by the single power source and of the switching of the LED assemblies, the temporary multiplexing-demultiplexing operation selectively delivering each electrical power level to at least one LED assembly.

11. The control device according to claim 9, wherein each LED assembly is also connected in series to an adjustable current generator controlled by the switching control module and making it possible to modulate the intensity of the electrical current and the distinct electrical power supplying each LED assembly concerned.

12. The control device according to claim 8, wherein the power control module and the switching control module are made up of a programmed microcontroller.

13. The control device according to claim 12, wherein the programmed microcontroller is linked to at least one internal control, the automotive vehicle's column switch.

14. The control device according to claim 12, wherein the programmed microcontroller is linked to at least one external event sensor such as a day/night or unexpected clear/obscure environment, degree of hygrometry, temperature sensor.

15. A computer program product recorded on a storage medium and comprising a sequence of instructions executable by a computer or by a calculator, by a specially dedicated integrated circuit or by a dedicated microcontroller, for the embodiment of the process according to claim 1, wherein said computer program product comprises at least, for a given rated electrical power of the power source and for a given multiplexing period:

a step of calculation of the cyclic ratio of the power pulses allocated to each LED assembly, the cyclic ratio being defined by default by the ratio of the multiplexing period to the number of active LED assemblies;

a step of detection of the existence of an internal control; and, in the absence of any internal control;

a step of calculation of each distinct power level devolved to each LED assembly defined as the ratio of the average level of electrical power associated with the function devolved to each LED assembly to the value of the cyclic ratio of the electrical power pulse over the multiplexing period; otherwise, in the presence of an internal control;

a step of returning to the calculation of the cyclic ratio of the power pulses allocated to each LED assembly after re-updating of the number of active LED assemblies, taking account of the activation or the deactivation of at least one LED assembly due to the existence of the internal control.

16. The computer program product recorded on a storage medium and comprising a sequence of instructions executable by a computer or by a calculator, by a specially dedicated integrated circuit or by a dedicated microcontroller, for the embodiment of the process according to claim 1, wherein said computer program product comprises at least, for a given rated electrical power of the power source and for a given multiplexing period:

a step of calculation of each distinct power level devolved to each LED assembly defined as the ratio of the average level of electrical power associated with the function devolved to each LED assembly to the value of the cyclic ratio of the electrical power pulse over the multiplexing period;

a step of detection of an external event; and, in the absence of any external event;

a step of returning to the step of calculation of each distinct power level devolved to each LED assembly; otherwise, in the presence of an external event modifying the conditions of illumination of the lighting and/or signalling;

a step of returning to the initial step, for modification of the multiplexing period and/or of the cyclic ratio.

17. The control process according to claim 3, wherein the pulse modulation of the electrical power level comprises for each distinct power level, the following steps:

establishing the average level of electrical power associated with each function;

adapting the distinct electrical power level and/or the cyclic ratio over the duration of the multiplexing period.

18. The control process according to claim 2, wherein the multiplexing period of the distinct electrical power levels is adjustable to a maximum value corresponding to a multiplexing frequency greater than 80 Hertz.

19. The control process according to claim 2, wherein the multiplexing period of the distinct electrical power levels is adjustable to a minimum value corresponding to a multiplexing frequency less than 400 Hertz.

20. The control device according to claim 10, wherein each LED assembly is also connected in series to an adjustable current generator controlled by the switching control module and making it possible to modulate the intensity of the electrical current and the distinct electrical power supplying each LED assembly concerned.

* * * * *